(12) United States Patent
Kangas et al.

(10) Patent No.: US 6,266,012 B1
(45) Date of Patent: Jul. 24, 2001

(54) USE OF GLOBAL POSITIONING SYSTEM IN LOCATING A RADIO TRANSMITTER

(75) Inventors: Ari Kangas, Uppsala; Erik Larsson, Kista, both of (SE); Sven Fischer, Nürnberg (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/162,385

(22) Filed: Sep. 28, 1998

(51) Int. Cl.$^7$ ....................................................... G01S 1/24
(52) U.S. Cl. ............................................................. 342/387
(58) Field of Search ......................... 342/387, 457, 342/463, 465, 357.06; 455/456

(56) References Cited

U.S. PATENT DOCUMENTS

| | | | |
|---|---|---|---|
| 5,469,409 | * 11/1995 | Anderson et al. | 342/463 |
| 5,510,801 | * 4/1996 | Engelbrecht et al. | 342/457 |
| 5,512,908 | 4/1996 | Herrick | 342/387 |
| 5,600,706 | 2/1997 | Dunn et al. | 379/59 |
| 5,621,646 | 4/1997 | Enge et al. | 364/449 |

FOREIGN PATENT DOCUMENTS

| | | | |
|---|---|---|---|
| 0733912 | 9/1996 | (EP) | G01S/5/06 |
| 9723785 | 7/1997 | (WO) | G01S/5/10 |
| WO 99/39517 A2 | 8/1999 | (WO) . | |

OTHER PUBLICATIONS

ISR for PCT/SE 99/01692; completed Feb. 9, 2000.
Levine, Judah. "Time Transfer Using a Multi–Channel Code–Based GPS Receiver". 1998 IEEE International Frequency Control Symposium. May 1998. pp. 284–291.*

\* cited by examiner

Primary Examiner—Gregory C. Issing
(74) Attorney, Agent, or Firm—Jenkens & Gilchrist, P.C.

(57) ABSTRACT

In locating the position of a radio transmitter in a radio communication network, signal timing measurements of a radio signal transmitted by the radio transmitter are obtained using respective satellite-based clocks. Clock discrepancy information about timing discrepancies between the satellite-based clocks is also obtained. The signal timing measurements are compared to obtain signal timing difference information, and the clock discrepancy information is used to eliminate effects of the timing discrepancies from the signal timing difference information.

26 Claims, 5 Drawing Sheets

USE OF GLOBAL POSITIONING SYSTEM IN LOCATING A RADIO TRANSMITTER

CROSS REFERENCE TO RELATED APPLICATIONS

The subject matter of this application is related to subject matter disclosed in copending U.S. Ser. No. 09/131,150 filed on Aug. 7, 1998 and in copending U.S. Ser. No. 09/123,201 filed on Jul. 27, 1998, which are hereby incorporated herein by reference.

FIELD OF THE INVENTION

The invention relates generally to radio communications and, more particularly, to techniques for locating the geographic position of a radio transmitter.

BACKGROUND OF THE INVENTION

The ability to locate the position of a radio transmitter in a radio communication network, for example locating a mobile communication unit operating in a radio communication system such as GSM (Global System for Mobile Communication), provides many well-known advantages. Exemplary uses of position locating capability include security applications, emergency response applications, and travel guidance applications.

Conventional position locating techniques require the capability of making timing measurements on selected radio signals. For example, a plurality of measurement nodes located throughout the communication network may make time of arrival (TOA) measurements on a radio signal from a selected mobile communication unit. With knowledge of the time of arrival of a given radio signal at various measurement nodes at known locations in the network, the location of the mobile communication unit can be estimated using conventional time difference of arrival (TDOA) techniques.

In order to accurately determine the time of arrival of the radio signal, conventional measurement nodes are often provided with GPS (Global Positioning System) receivers to receive highly accurate clock signals from satellites orbiting the earth. Thus, the various measurement nodes ideally utilize the same absolute time base (GPS time) to make their time of arrival measurements.

One problem with the aforementioned use of GPS time in measurement nodes is that, for example in urban environments, sometimes only one or a few satellites will be visible to the GPS receiver in a given measurement node. Moreover, the one or few satellites visible to a first measurement node may be different than the one or few satellites visible to a second measurement node. If the position of the GPS receiver (i.e., the position of the measurement node) is known, it is sufficient to see only one satellite to obtain the absolute GPS time reference.

However, the accuracy of the absolute time reference obtained in this manner is typically low, mainly due to the conventional Selective Availability (SA) error which is intentionally induced in each satellite's GPS clock signal to degrade the accuracy of the signal, for global security reasons. Although the SA error has a zero mean over a long period (many hours) of time, it is random and, therefore, unpredictable on a short time basis. The SA error of a given satellite is independent of the SA errors of other satellites, but is correlated between different geographical locations. That is, the SA error in the GPS timing signal received from a given satellite will be approximately equal at two different measurement nodes if the geographical distance between those two measurement nodes is sufficiently small.

Due to the SA error, the accuracy of a GPS timing reference obtained from only a single satellite is poor, having a standard deviation of, for example, 100–200 ns. If a first measurement node sees only a first satellite and a second measurement node sees only a second satellite which is different from the first satellite, then the difference between the absolute time references respectively obtained by the two measurement nodes can range from, for example, $\sqrt{2}\times 100$ ns to $\sqrt{2}\times 200$ ns because the SA error is uncorrelated between different satellites. On the other hand, if the two measurement nodes could obtain their absolute time references from the same satellite, then the difference between the absolute time references of the two measurement nodes would be on the order of $\sqrt{2}\times 30$ ns.

The potential of relatively large differences between the absolute time references of the measurement nodes makes it difficult to compare the time of arrival measurements from the measurement nodes to obtain time difference of arrival information that is conventionally used to locate the radio transmitter. In other words, if the measurement nodes do not have the same time base, then this adversely impacts the ability to estimate the location of the transmitter using conventional time difference of arrival (TDOA) techniques.

Differences in absolute time base cause similar problems when stationary reference mobile units equipped with GPS receivers are used to measure the radio transmission timing of associated fixed-site transceivers in a radio communication network. When the measured transmission timings are compared in order to determine a real-time difference between the fixed-site transceivers, the difference between the respective absolute time bases of the reference mobile units adversely affects the calculation of the real-time difference.

It is therefore desirable to provide position locating techniques which avoid the aforementioned disadvantages of differing GPS time bases in respective measurement nodes.

The present invention provides a position locating technique wherein information indicative of satellite timing differences between the time references provided by different satellites is used to account for the satellite timing differences when comparing radio signal timing measurements provided by measurement nodes.

DETAILED DESCRIPTION

Figure 1:
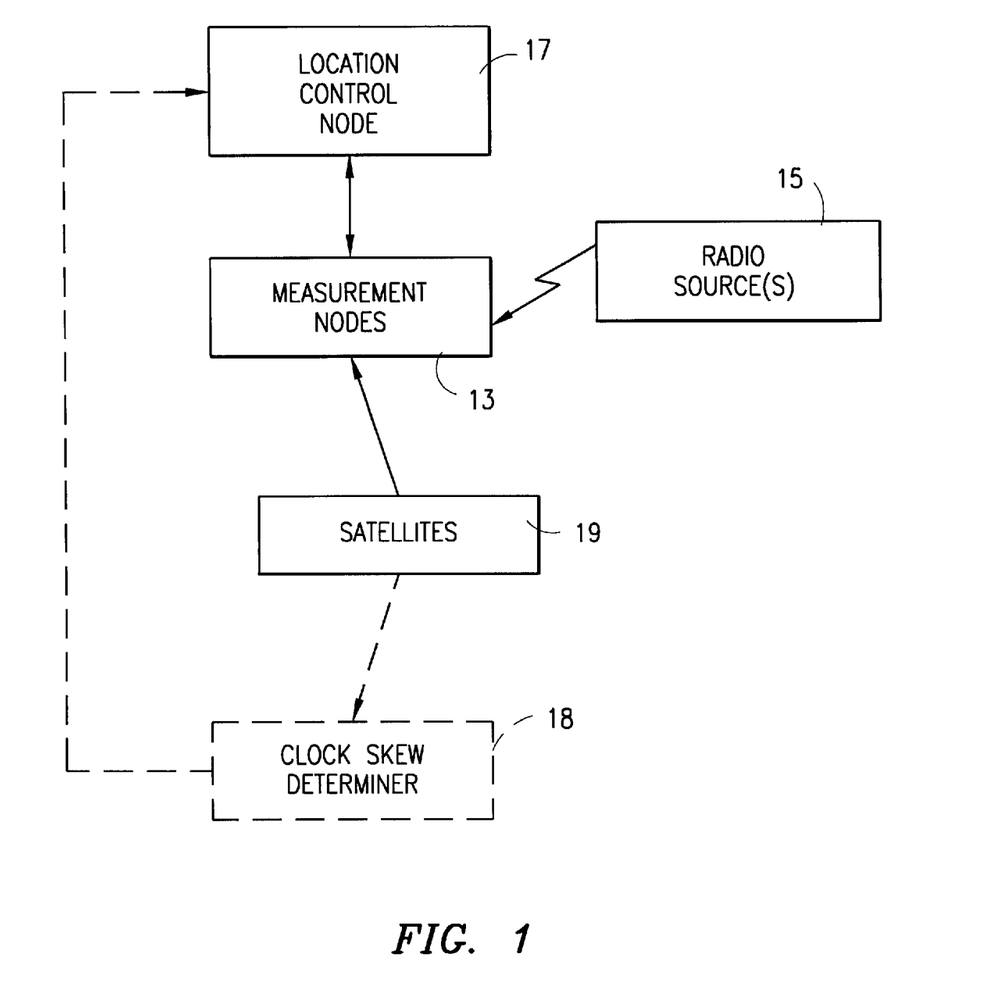
FIG. 1 is a block diagram of an exemplary arrangement which utilizes techniques of the present invention to make timing measurements on selected radio signals for use in locating a radio transmitter in a radio communication network.

FIG. 1 illustrates diagrammatically an exemplary arrangement for making timing measurements of radio signals according to the present invention. A plurality of measurement nodes at 13 make timing measurements of radio signals received from a radio transmission source or sources at 15. The measurement nodes at 13 can be, for example, time of arrival measurement units (TMUs) as disclosed in aforementioned copending U.S. Ser. No. 09/123,201. The TMUs measure the time of arrival of a radio signal received from a selected mobile communication unit, which mobile communication unit is exemplary of the radio transmission sources 15. As another example, the measurement nodes could be stationary reference mobile units measuring the timing of broadcast control channels (BCCHs) of respective base transceiver stations (BTSs) of a GSM system, which base transceiver stations are also exemplary of the radio transmission sources 15.

The location control node 17, for example a mobile location controller (MLC) as disclosed in copending U.S. Ser. No. 09/123,201, receives the timing measurements made by the measurement nodes. In the example of TMUs measuring the time of arrival of a radio signal transmitted from a mobile communication unit, the location control node computes the time differences between the time of arrival measurements made by the various TMUs, and uses this time difference of arrival information and other available information to estimate the location of the mobile communication unit.

In the example of the location control node receiving from a plurality of stationary reference mobile units timing measurements of the broadcast control channels of respective base transceiver stations, the location control node compares these timing measurements in order to determine the real time differences (RTDs) between the radio transmissions of the respective base transceiver stations. This real time difference information can then be used to estimate the location of a mobile communication unit (not shown) which is itself observing time differences between, for example, the BCCH channels of the respective base transceiver stations. This downlink observed time difference (OTD) technique is described in detail in aforementioned copending U.S. Ser. No. 09/131,150.

The measurement nodes 13 also receive timing references, for example GPS clock signals, from a plurality of satellites 19. The timing references are used in the timing measurements made by the measurement nodes.

Figure 4:
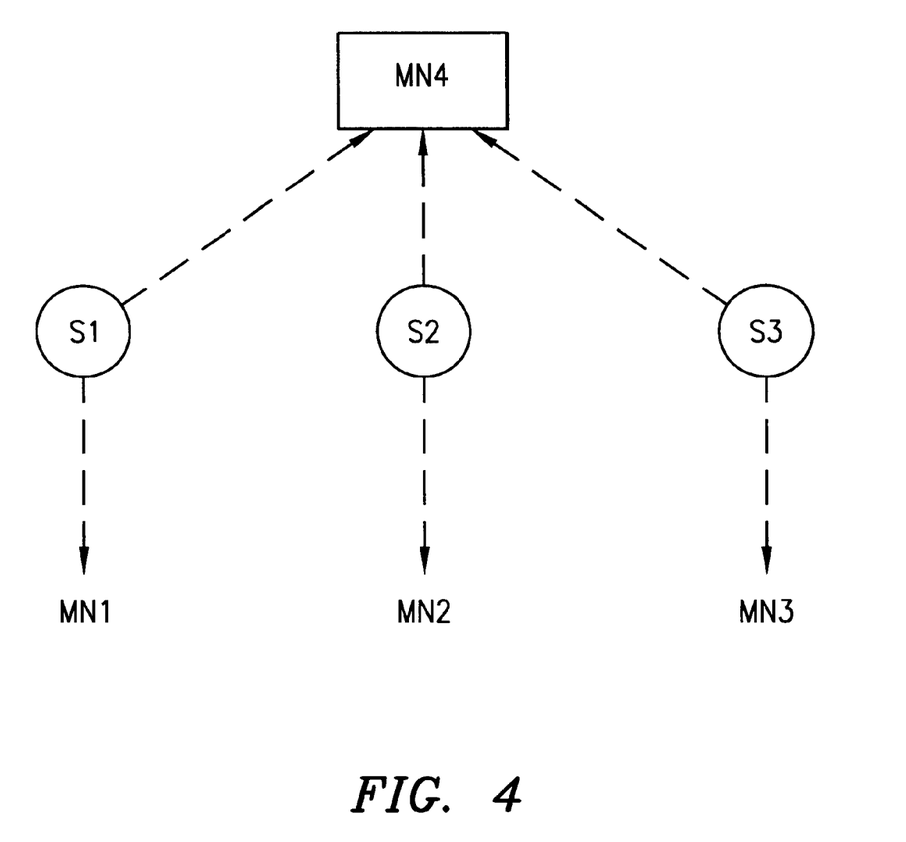
FIG. 4 illustrates one example of the interaction between the measurement nodes and satellites of FIG. 1.

Referring now to FIG. 4, one example of the relationship between the measurement nodes and the satellites of FIG. 1 is illustrated. Each of measurement nodes MN1, MN2 and MN3, due to their location and surrounding environment (e.g., a nearby building), see only one satellite each. Measurement node MN1 sees satellite S1, measurement node MN2 sees satellite S2 and measurement node MN3 sees satellite S3. As described above, due to the unique SA errors included in GPS time references obtained from the respective satellites S1, S2 and S3, the time bases (clocks) of measurement nodes MN1, MN2 and MN3 can be expected to be skewed from one another. This difference in the time bases of the respective measurement nodes disadvantageously affects the operation of the location control node in determining the timing differences between the radio signals measured at the respective measurement nodes.

However, because the location control node 17 of FIG. 1 is only concerned with determining the differences between the timing measurements made by the respective measurement nodes, the clock skew problem can be eliminated if the location control node can obtain information indicative of the timing differences between the GPS timing references provided by the satellites S1–S3. Thus, if at least one measurement node such as MN4, can see all three satellites S1, S2 and S3, then it can measure the clock skew between the GPS clock signals obtained from the satellites, and provide this information to the location control node 17 of FIG. 1.

Then, when the location control node computes the differences between the radio signal timing measurements made by the respective measurement nodes MN1–MN3, it can determine, from the clock skew information provided by measurement node MN4, how much of each calculated timing difference is due to the clock skew between the GPS clocks used by the respective measurement units. Thus, because the location control node only calculates the differences between the timing measurements made by the various measurement nodes, if the location control node also has information about the time base differences between the respective measurement nodes, then it can easily compensate for those time base differences.

Figure 2:
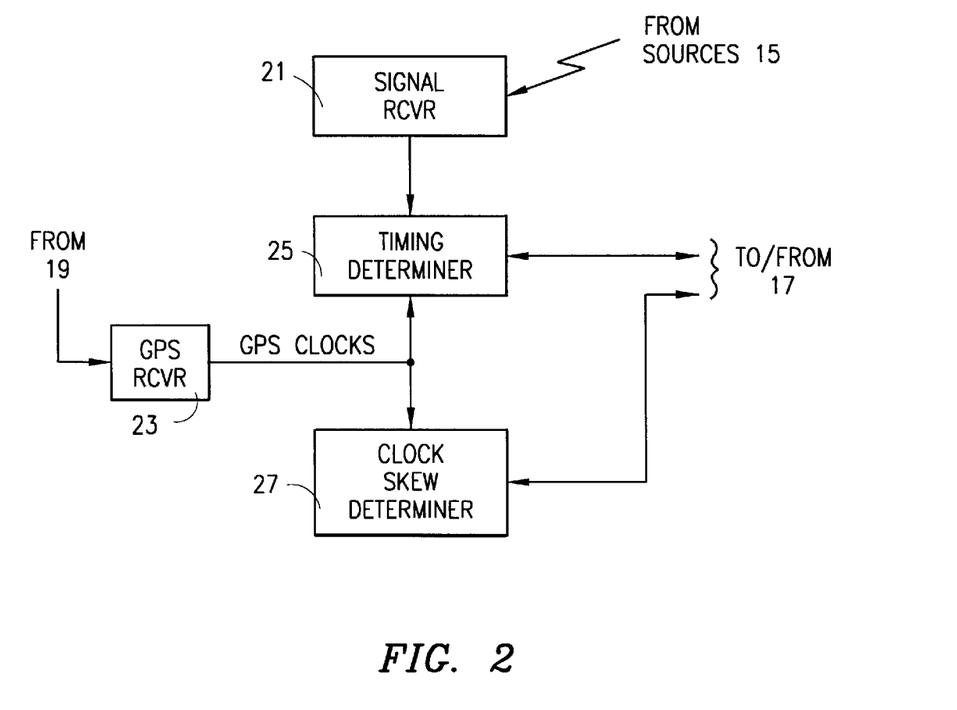
FIG. 2 illustrates diagrammatically pertinent portions of one example implementation of a measurement node of FIG. 1.

FIG. 2 illustrates pertinent portions of one exemplary embodiment of a measurement node which can be used at 13 in the arrangement of FIG. 1. The measurement node example of FIG. 2 includes a radio receiver 21, a GPS receiver 23, a timing determiner 25, and a clock skew determiner 27. The signal receiver 21 receives the radio signal from the selected radio transmission source 15, and the GPS receiver 23 receives GPS timing references from all satellites that are visible to the measurement node. The GPS receiver provides, for each satellite visible to the measurement node, a corresponding GPS clock signal. The GPS clock signal is (or GPS clock signals are) output to the timing determiner 25. The timing determiner 25 also receives from the signal receiver 21 the radio signal whose timing is being measured. The timing determiner 25, in one embodiment, uses conventional techniques to measure the timing of the received signal relative to all GPS clocks provided by the GPS receiver 23. This timing information (e.g., time of arrival information) is then output to the location control node 17 of FIG. 1. In another embodiment, the location control node can specify to the timing determiner 25 which of the available GPS clocks should be used in the measurements.

The clock skew determiner 27 also receives from the GPS receiver 23 all GPS clock signals obtained from the satellites that are visible to the measurement node. The clock skew determiner 27 determines the timing relationships (i.e., differences or skews) between the GPS clock signals. In one embodiment, the clock skew determiner determines the timing difference between every possible pair of GPS clock signals available in the measurement node. The clock skew information is then reported to the location control node. In another embodiment, the location control node 17 can, as desired, compute the timing differences between every possible pair of GPS clocks, based on timing relationships received from the clock skew determiner.

Figure 3:
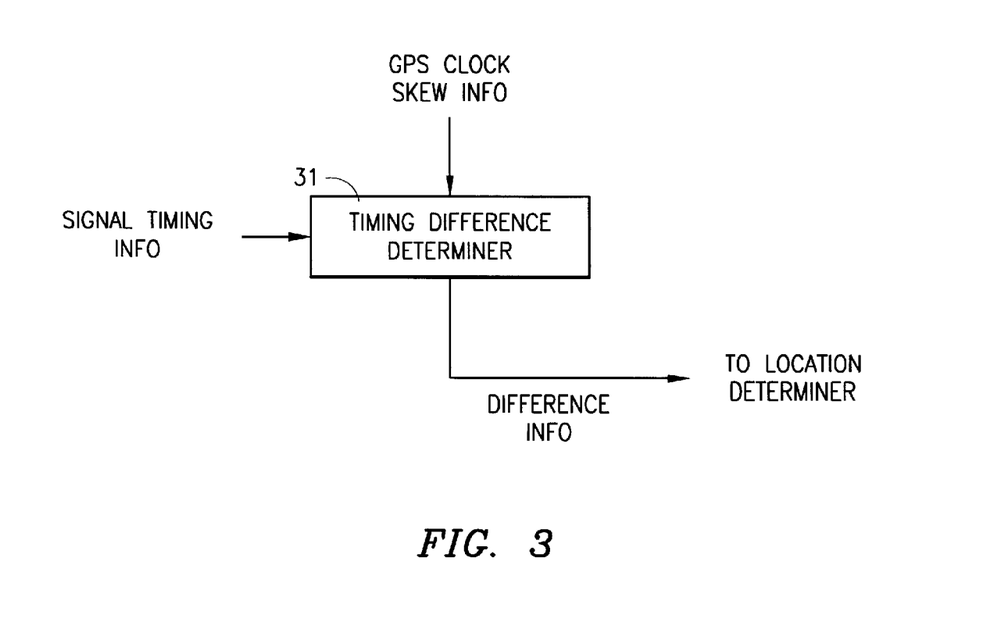
FIG. 3 illustrates diagrammatically pertinent portions of an example implementation of the location control node illustrated in FIG. 1.

Referring now to FIG. 3, pertinent portions of an example location control node according to the invention are illustrated. A timing difference determiner 31 receives as input the signal timing information from the timing determiners 25 of the various measurement nodes 13. The signal timing information received from each measurement node can include timing measurements relative to each GPS clock available to the measurement node from the satellites visible thereto. The signal timing information preferably correlates each timing measurement to the satellite whose GPS timing reference was used to produce the GPS clock that was used to make that particular measurement. When the timing difference determiner 31 determines the timing differences between the signal timing measurements received from the various measurement nodes, it therefore also knows the satellites whose timing references were used to make the measurements. The timing difference determiner can therefore also use the GPS clock skew inputs received from the various measurement nodes to compensate for the clock skews among the clocks used to make the timing measurements.

For example, and also referring to FIG. 4, if the signal timing information received from measurement node MN1 indicates that the MN1 timing measurement was made relative to the GPS clock from satellite S1, and if signal timing information received from the measurement node MN2 indicates that the MN2 timing measurement was made relative to the GPS clock from satellite S2, then the timing difference determiner 31 can use the GPS clock skew information received from measurement node MN4 to eliminate from the timing difference determination the effect of the clock skew between the GPS clocks from satellites S1 and S2. Because the clock skew information provided by measurement node MN4 includes information about the clock skew between satellites S1 and S2 (because both of these satellites are visible to measurement node MN4), the timing difference determiner 31 recognizes that the clock skew between satellites S1 and S2 can be removed from the timing difference calculation.

The result of the timing difference calculation, free from the clock skew introduced by the SA errors associated with the satellites S1 and S2, is then provided to a location determiner in the location control node. The location determiner can then use this timing difference information in combination with other conventionally produced information to determine the location of the radio transmission source in conventional fashion.

Figure 5:
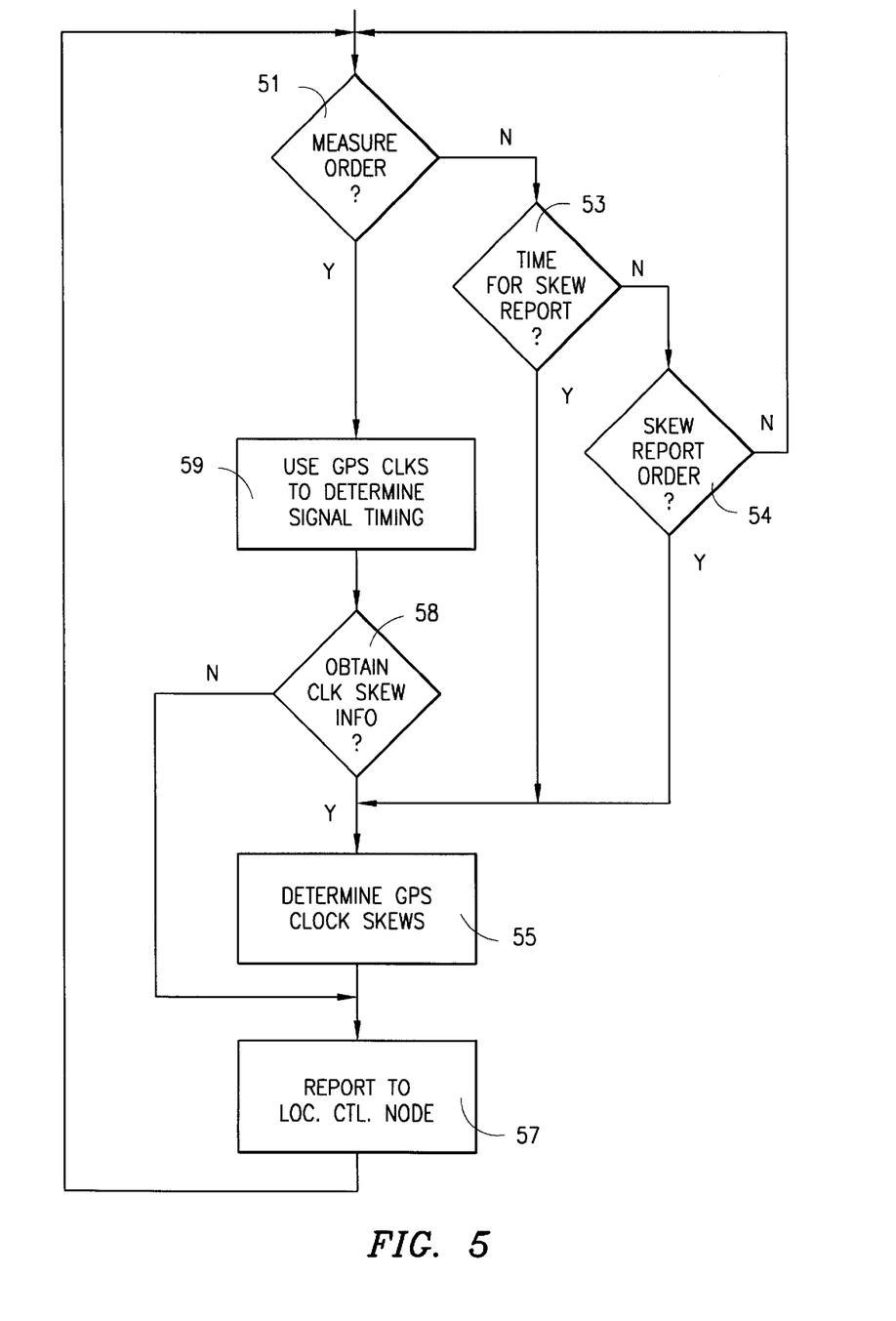
FIG. 5 illustrates in flow diagram format exemplary operations performed by the example measurement node of FIG. 2.

FIG. 5 illustrates exemplary operations which can be performed by the example measurement node of FIG. 2. At 51, it is determined whether or not a measurement order has been received from the location control node 17. If not, it is determined at 53 whether or not it is time to send a periodic clock skew report to the location control node. Such a periodic clock skew report can be useful to the location control node in making timing difference calculations that do not necessarily even involve signal timing measurements from the measurement node from which the clock skew report is received. (Recall the above example wherein a clock skew report from measurement node MN4 was used in calculating a difference between measurements made by nodes MN1 and MN2). If it is time for a clock skew report at 53, then at 55 the clock skew determiner 27 determines the timing differences between the GPS clocks used in the measurement node, and thereafter reports these timing differences, or clock skews, to the location control node at 57. If it is not time for a periodic clock skew report at 53, it is determined at 54 whether the location control node 17 has ordered a clock skew report. If so, steps 55 and 57 are executed as above. If no order has been received at 54, then control returns to the decision block 51.

When at 51 a measurement order is received, at 59 the timing determiner 25 uses all available GPS clocks, or a subset thereof specified by the location control node, to make the desired timing measurement on the radio signal received from the radio transmission source. It is then determined at 58 whether to obtain GPS clock skew information. For example, the measurement order received at 51 can also indicate whether or not a clock skew report is desired. As another example, the measurement node can decide unilaterally, based on current circumstances, that no clock skew information will be obtained. For example, if the measurement node has an unusually small amount of time to provide its measurement report to the location control node, then the measurement node may decide at 58 not to obtain clock skew information for the current report, in order to meet the time limit.

If it is decided at 58 to obtain the clock skew information, then the clock skews are determined at 55, and the timing measurements and clock skews are reported to the location control node at 57. Otherwise, block 55 is skipped, and only the timing measurements are provided to the location control node at 57.

Figure 6:
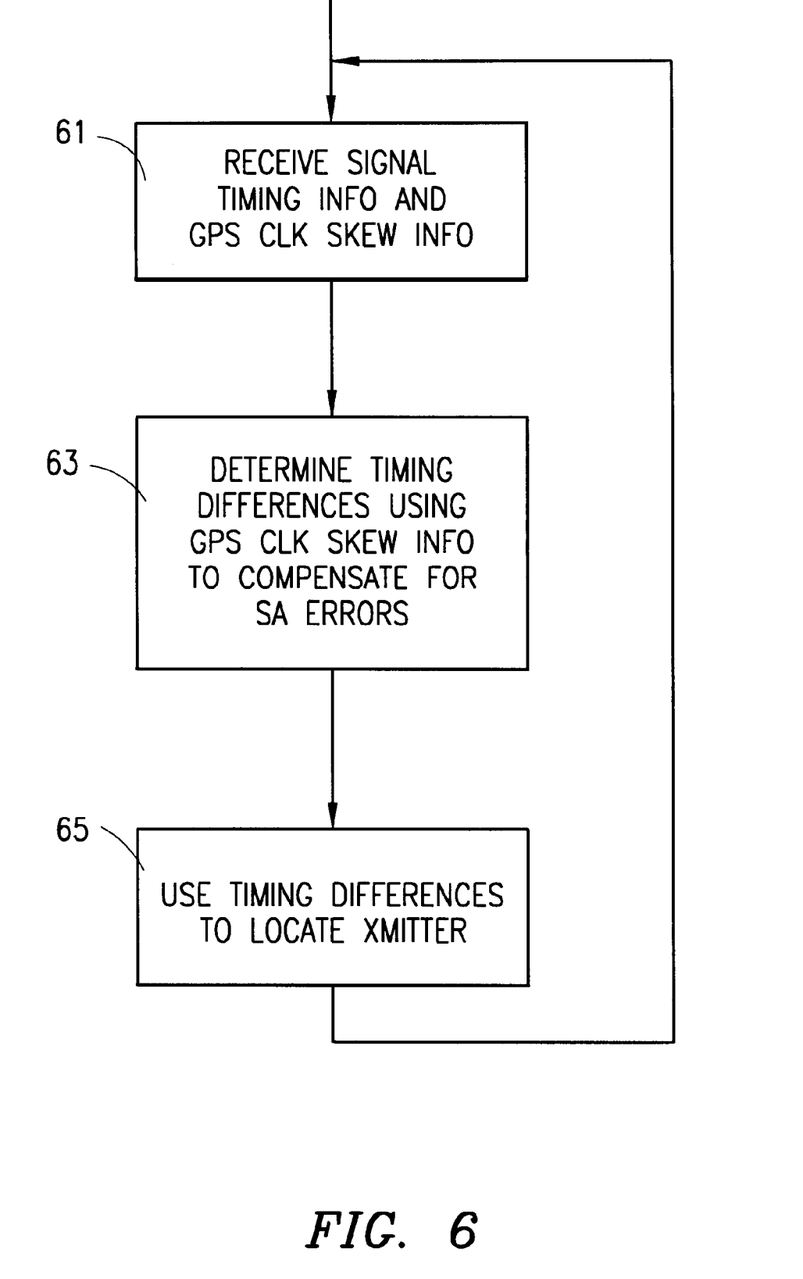
FIG. 6 illustrates in flow diagram format exemplary operations performed by the location control node portions illustrated in FIG. 3.

FIG. 6 illustrates exemplary operations that can be performed by the exemplary location control node portions illustrated in FIG. 3. At 61, the signal timing measurements and GPS clock skew information are received as inputs to the timing difference determiner 31. At 63, the timing difference determiner 31 determines the differences in signal timing measurements, using the appropriate GPS clock skew information to compensate for the SA errors in the GPS clock signals that were used to make the timing measurements. At 65, the calculated timing differences are output to the location determiner for use along with other available information to determine the location of the radio transmission source.

Returning to FIG. 1, there is shown in broken lines an additional option, namely a dedicated GPS clock skew determiner 18 which is positioned in the network so that it can see all available satellites, measure the clock skews between the respective GPS clocks, and report the clock skew information to the location control node 17. In this manner, the location control node can receive (periodically or on demand) the clock skews between any given pair of GPS clock signals that might be used to make signal timing measurements in the measurement nodes. Regardless of whether a dedicated clock skew determiner is used as illustrated in FIG. 1, it is clearly desirable to have at least one measurement node in the network positioned so that all available satellites are visible to that measurement node. In this manner, the location control node can obtain the desired clock skew information for any combination of GPS clocks.

It will be apparent to workers in the art from the foregoing description that measurement nodes and location control nodes incorporating the features of the present invention can be readily produced by, for example, suitable modification of hardware, software or both in the data processing portions of conventional measurement nodes and location control nodes.

It should be clear from the foregoing description that the present invention compensates for SA errors in the GPS clock signals used to make signal timing measurements that are to be compared during the process of locating the position of a radio transmitter. The techniques of the invention are also equally applicable to compensate for synchronization errors in other (non-GPS) satellite-based timing systems as well.

Although exemplary embodiments of the present invention have been described above in detail, this does not limit the scope of the invention, which can be practiced in a variety of embodiments.

What is claimed is:

1. An apparatus for determining radio signal timing relationships in a radio communication network, comprising:

an input for receiving first and second signal timing measurements of at least one radio signal transmitted in the radio communication network and for receiving clock skew information about a timing discrepancy between first and second satellite-based clock signals respectively used to make the first and second signal timing measurements;

a timing relationship determiner coupled to said input for comparing the first and second signal timing measurements to obtain signal timing difference information and for using the clock skew information to compensate for an effect of said timing discrepancy in the signal timing difference information, the signal timing difference information being adjusted to account for a contribution of said timing discrepancy to the signal timing difference information; and an output for outputting the adjusted signal timing difference information to a location determiner, the location determiner operable to determine the position of a radio transmitter in the radio communication network.

2. The apparatus of claim 1, wherein said first and second signal timing measurements include first and second time of arrival measurements, and wherein said signal timing difference information includes time difference of arrival information.

3. The apparatus of claim 1, wherein said input is for receiving first and second signal timing measurements of a radio signal transmitted by a mobile radio transmitter in the radio communication network.

4. The apparatus of claim 1, wherein said input is for receiving first and second signal timing measurements of respective first and second radio signals respectively transmitted by first and second fixed-site radio transmitters in the radio communication network.

5. A method of measuring radio signal timing relationships in a radio communication network, comprising:

obtaining first and second signal timing measurements of at least one radio signal transmitted in the radio communication network, including using first and second satellite-based clocks respectively derived from first and second satellite timing references to make the respective first and second signal timing measurements;

providing the first and second satellite-based clocks at a first location;

obtaining, in response to the first and second satellite-based clocks provided at the first location, clock discrepancy information about a timing discrepancy between the first and second satellite-based clocks caused by a discrepancy between the first and second satellite timing references from which the first and second satellite-based clocks are derived;

comparing the first and second signal timing measurements to obtain signal timing difference information;

using the clock discrepancy information to compensate for an effect of the timing discrepancy in the signal timing difference information;

adjusting the signal timing difference information to account for a contribution of the timing discrepancy to the signal timing difference information; and outputting the adjusted signal timing difference information to a location determiner, the location determiner operable to determine the position of a radio transmitter in the radio communication network.

6. The method of claim 5, wherein said step of obtaining clock discrepancy information includes automatically obtaining the clock discrepancy information periodically.

7. The method of claim 5, including requesting the clock discrepancy information, said step of obtaining clock discrepancy information including obtaining the clock discrepancy information in response to said requesting step.

8. The method of claim 5, including requesting the first and second signal timing measurements, said step of obtaining first and second signal timing measurements including obtaining the first and second signal timing measurements in response to said requesting step, and said step of obtaining clock discrepancy information including obtaining the clock discrepancy information in response to said requesting step.

9. The method of claim 8, wherein said step of obtaining clock discrepancy information includes selectively obtaining the clock discrepancy information in response to said requesting step.

10. The method of claim 5, wherein said step of obtaining first and second signal timing measurements includes receiving the first and second signal timing measurements respectively from first and second measurement nodes, and wherein said step of obtaining clock discrepancy information includes receiving the clock discrepancy information from one of the first and second measurement nodes.

11. The method of claim 5, wherein said step of obtaining first and second signal timing measurements includes receiving the first and second signal timing measurements respectively from first and second measurement nodes, and wherein said step of obtaining clock discrepancy information includes receiving the clock discrepancy information from a source other than the first and second measurement nodes.

12. The method of claim 5, wherein said step of obtaining first and second signal timing measurements includes using a measurement node to obtain one of the signal timing measurements, and wherein said step of obtaining clock discrepancy information includes using the measurement node to obtain clock discrepancy information about timing discrepancies between all satellite-based clocks available to the measurement node.

13. The method of claim 5, wherein said step of using first and second satellite-based clocks includes using first and second Global Positioning System (GPS) clocks to make the respective first and second signal timing measurements, and wherein said timing discrepancy is caused by Selective Availability (SA) errors induced in said first and second Global Positioning System clocks.

14. The method of claim 5, wherein said step of obtaining first and second signal timing measurements includes obtaining first and second time of arrival measurements, and wherein said comparing step includes making time difference of arrival measurements.

15. The method of claim 5, wherein said comparing step includes determining a difference between said first and second signal timing measurements, and wherein said step of using clock discrepancy information includes determining a contribution of the timing discrepancy to said difference, and adjusting said difference to account for said contribution.

16. The method of claim 5, wherein said step of obtaining first and second signal timing measurements includes obtaining first and second signal timing measurements of a radio signal transmitted by a mobile radio transmitter in the radio communication network.

17. The method of claim 5, wherein said step of obtaining first and second signal timing measurements includes obtaining first and second signal timing measurements of respective first and second radio signals respectively transmitted by first and second fixed-site radio transmitters in the radio communication network.

18. The method of claim 5, wherein the location determiner uses the adjusted signal timing difference information along with other available information to determine the position of the radio transmitter in the radio communication network.

19. The method of claim 18, wherein the result of the timing difference calculation is free from the timing discrepancy caused by Selective Availability (SA) errors induced in the first and second satellite-based clock signals.

20. The method of claim 5, wherein the adjusted signal timing difference information is indicative of the result of a timing difference calculation wherein timing discrepancy, between first and second satellites, is removed from the signal timing difference information.

21. An apparatus for making radio signal timing measurements in a radio communication network, comprising:

an input for receiving a radio signal transmitted in the radio communication network;

in input for providing at a first location a plurality of satellite-based clock signals respectively derived from a plurality of satellite timing references;

a signal timing determiner coupled to said inputs for using at least one of said satellite-based clock signals to produce a signal timing measurement of the received radio signal;

a clock skew determiner coupled to said clock signal input and responsive to first and second ones of said satellite-based clock signals for providing clock skew information indicative of a timing discrepancy between the first and second satellite-based clock signals caused by a discrepancy between the respective satellite timing references from which the first and second satellite-based clock signals are derived; and an output for outputting said signal timing measurement and said clock skew information.

22. The apparatus of claim 21, wherein said signal timing measurement includes a time of arrival measurement.

23. The apparatus of claim 21, wherein said clock skew determiner is automatically operable to produce said clock skew information periodically.

24. The apparatus of claim 21, including an input for receiving a request for said signal timing determiner to produce said signal timing measurement, said clock skew determiner selectively responsive to said request to produce said clock skew information.

25. The apparatus of claim 21, wherein said satellite-based clock signals are Global Positioning System (GPS) clock signals, and wherein said timing discrepancy is caused by Selective Availability (SA) errors induced in said first and second Global Positioning System clock signals.

26. The apparatus of claim 21, wherein said clock skew determiner is operable to provide clock skew information indicative of timing discrepancies between all of said satellite-based clock signals.

* * * * *